(12) United States Patent
Huang et al.

(10) Patent No.: US 10,067,382 B2
(45) Date of Patent: Sep. 4, 2018

(54) SUPPORTING MEMBER FOR DIFFUSION PLATE AND BACKLIGHT MODULE

(71) Applicant: SHENZHEN TCL NEW TECHNOLOGY CO., LTD, Shenzhen, Guangdong (CN)

(72) Inventors: Yuangui Huang, Guangdong (CN); Xiaoxu Dong, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/113,466

(22) PCT Filed: Dec. 13, 2014

(86) PCT No.: PCT/CN2014/093772
§ 371 (c)(1),
(2) Date: Jul. 22, 2016

(87) PCT Pub. No.: WO2016/037431
PCT Pub. Date: Mar. 17, 2016

(65) Prior Publication Data
US 2017/0010506 A1 Jan. 12, 2017

(30) Foreign Application Priority Data
Sep. 11, 2014 (CN) .................. 2014 2 0522746 U

(51) Int. Cl.
*G02F 1/1335* (2006.01)
(52) U.S. Cl.
CPC .. *G02F 1/133608* (2013.01); *G02F 1/133606* (2013.01)

(58) Field of Classification Search
CPC ............... G02F 1/133606; G02F 1/608; G02F 1/133608
See application file for complete search history.

(56) References Cited

U.S. PATENT DOCUMENTS

| 2002/0044437 | A1 | 4/2002 | Lee |
| 2006/0104083 | A1* | 5/2006 | Kwon ............... G02F 1/133608 362/559 |
| 2010/0073596 | A1 | 3/2010 | Jeong et al. |

FOREIGN PATENT DOCUMENTS

| CN | 201954497 U | 8/2011 |
| EP | 2343478 A1 | 7/2011 |
| JP | 2007322697 A | 12/2007 |

OTHER PUBLICATIONS

International Search Report of PCT Patent Application No. PCT/CN2014/093772 dated May 11, 2015.
(Continued)

*Primary Examiner* — Thomas M Sember

(57) ABSTRACT

The present disclosure provides a supporting member for diffusion plate and a backlight module, in which the supporting member for diffusion plate is mounted between a backplane and a diffusion plate, the supporting member for diffusion plate includes a fixing portion and a supporting portion; the fixing portion is secured to the backplane; the supporting portion connects the fixing portion and extends opposite from the fixing portion; the supporting portion contacts and elastically supports the diffusion plate, when the supporting portion is pressed by a force from the extending direction of the supporting portion, the supporting portion causes an elastic deformation and shortens along the extending direction. The disclosed supporting member for diffusion plate will not damage the diffusion plate.

15 Claims, 5 Drawing Sheets

(56) References Cited

OTHER PUBLICATIONS

Extended European Search Report of counterpart European Patent Application No. 14901669.3 dated Feb. 1, 2018.

* cited by examiner

SUPPORTING MEMBER FOR DIFFUSION PLATE AND BACKLIGHT MODULE

TECHNICAL FIELD

The present disclosure relates to liquid crystal display technology, and particularly to a supporting member for diffusion plate and backlight module.

DESCRIPTION OF RELATED ART

Direct illumination-type backlight technology is that the backlight module is directly positioned under liquid crystal panel, which allows the liquid crystal television (LCD TV) having a uniform backlight and subtle images.

In the current direct illumination-type backlight module, the diffusion plate is supported by a middle frame and positioned on the backplane. For the diffusion plate is thin, and a large cavity is usually formed between the diffusion plate and the backplane, a supporting member is typically provided to cooperate with the diffusion plate to prevent a deformation of the diffusion plate which will badly affect the displayed image.

However, the current supporting member is column type, and has defects like: poor toughness when the supporting member is fabricated by high strength materials. As a result, when the light-emitting surface of the liquid crystal panel is pressed, the stress transfers to the diffusion plate to make the diffusion plate deform, the supporting member probably cracks the diffusion plate and/or the liquid crystal panel, or the supporting member is cracked to no longer support the diffusion plate and the liquid crystal panel.

BRIEF SUMMARY OF THE DISCLOSURE

A main object of the present disclosure is to prevent the supporting member for diffusion plate from cracking the diffusion plate when the supporting member has a high strength.

To achieve the object, the present disclosure provides a supporting member for diffusion plate, mounted between a backplane and a diffusion plate; the supporting member for diffusion plate includes a fixing portion and a supporting portion; the fixing portion is secured to the backplane; the supporting portion connects the fixing portion and extends opposite from the fixing portion; the supporting portion contacts and elastically supports the diffusion plate, when the supporting portion is pressed by a force from the extending direction of the supporting portion, the supporting portion causes an elastic deformation and shortens along the extending direction.

Preferably, the supporting portion includes: a supporting plate and one or more reinforcing ribs; the supporting plate connects the fixing portion and extends opposite from the fixing portion; the reinforcing rib connects the junction of the fixing portion and the supporting plate to improve the supporting of the supporting plate; the portion of the supporting plate between the top end of the supporting plate and the connecting position of the reinforcing rib and the supporting plate defines an elastic deformation portion; when the supporting portion being pressed by a force from the extending direction, the elastic deformation portion causes an elastic deformation to allow the supporting portion shortening along the extending direction.

Preferably, the supporting plate includes two long sides connected with the fixing portion; the quantity of the reinforcing ribs is two, each reinforcing rib locates at the middle of each long side.

Preferably, the reinforcing rib has a half circular bottom surface which connects the fixing portion, the reinforcing rib gradually downsizes along the direction opposite from the fixing portion.

Preferably, the supporting plate gradually downsizes along the direction opposite from the fixing portion.

Further, to achieve the object, the present disclosure also provides a backlight module, the backlight module includes a backplane, a diffusion plate, and a supporting member for diffusion plate; the diffusion plate is mounted to the top side of the backplane, the supporting member for diffusion plate is mounted between the backplane and the diffusion plate to support the diffusion plate;

The backplane defines a mounting structure on a surface of the backplane towards the diffusion plate;

The supporting member for diffusion plate includes: a fixing portion and a supporting portion; the fixing portion is secured to the mounting structure of the backplane; the supporting portion connects the fixing portion and extends opposite from the fixing portion, the supporting portion contacts and supports the diffusion plate, when the supporting portion is pressed by a force from the extending direction of the supporting portion, the supporting portion causes an elastic deformation and shortens along the extending direction.

Preferably, the supporting portion includes: a supporting plate and one or more reinforcing ribs; the supporting plate connects the fixing portion and extends opposite from the fixing portion; the reinforcing rib connects the junction of the fixing portion and the supporting plate; the portion of the supporting plate between the top end of the supporting plate and the connecting position of the reinforcing rib and the supporting plate defines an elastic deformation portion; when the supporting portion being pressed by a force from the extending direction, the elastic deformation portion causes an elastic deformation to allow the supporting portion shortening along the extending direction.

Preferably, the supporting plate includes two long sides connected with the fixing portion; the quantity of the reinforcing ribs is two, each reinforcing rib locates at the middle of each long side.

Preferably, the reinforcing rib has a half circular bottom surface which connects the fixing portion, the reinforcing rib gradually downsizes along the extending direction.

Preferably, the supporting plate gradually downsizes along the extending direction.

Preferably, the backlight module further includes a lamp, the lamp is mounted on a surface of the backplane opposite to the diffusion plate; the angle between the longitudinal direction of the supporting plate and the longitudinal direction of the lamp is smaller than 10°.

Preferably, the fixing portion of the supporting member for diffusion plate includes: a connecting plate and a latch; the supporting portion of the supporting member for diffusion plate is protruded on a top surface of the connecting plate; the latch of the supporting member for diffusion plate is protruded on a bottom surface of the connecting plate; the latch includes a neck portion and a head portion, the neck portion connects the connecting plate and the head portion, the head portion is larger than the neck portion;

The mounting structure of the backplane includes a base piece formed on the backplane, and a latching notch defined in the base piece corresponding to the latch; the latching notch includes a wide notch portion and a narrow notch portion;

The latch can move freely when the latch inserts in the wide notch portion of the latching notch; when the latch inserts in the narrow notch portion, the connecting plate and the head portion of the latch resist the two opposite sides of the base piece respectively, allowing the supporting member for diffusion plate assembling to the backplane.

Preferably, a neck notch portion is defined at the conjunction of the wide notch portion and the narrow notch portion; the smallest width of the neck notch portion is smaller than the smallest width of the neck portion of the latch, the neck notch portion limits the latch in the narrow notch portion;

An abdicating hole is defined in the surface of the latch away from the connecting plate; when the latch removes between the wide notch portion and the narrow notch portion, the latch is pressed by the edge of the neck notch portion and deforms towards the abdicating hole, and when the latch positions in the wide notch portion or in the narrow notch portion, the latch recover its elasticity Preferably, the fixing portion of the supporting member for diffusion plate further includes a limiting member, the limiting member is protruded from the bottom surface of the connecting plate; when the latch inserts in the narrow notch portion of the latching notch, the limiting member inserts in the wide notch portion, and when the latch rotates in the narrow notch portion, the limiting member resists the edge of the wide notch portion, which limit the rotation of the supporting member for diffusion plate.

Preferably, the bottom surface of the connecting plate of the supporting member for diffusion plate depresses to present like a dish; when the latch inserts in the narrow notch portion of the latching notch, the dish shaped connecting plate causes an elastic deformation by the resisting of the base piece, allow the connecting plate and the head portion of the latch clamping the base piece.

The disclosed supporting member for diffusion plate can cause an elastic deformation when being pressed by the diffusion plate, which buffers the compression of the diffusion plate, thus avoiding the crack of the diffusion plate, the crack of the liquid crystal panel located on the light-emitting surface of the diffusion plate, or the crack of the supporting member for diffusion plate.

The implementations, functional features and advantages of the present disclosure will be further described with reference to embodiments thereof and the accompanying drawings.

DETAILED DESCRIPTION

It should be appreciate that, the embodiments described herein are only intended to illustrate but not to limit the present disclosure.

Figure 1:
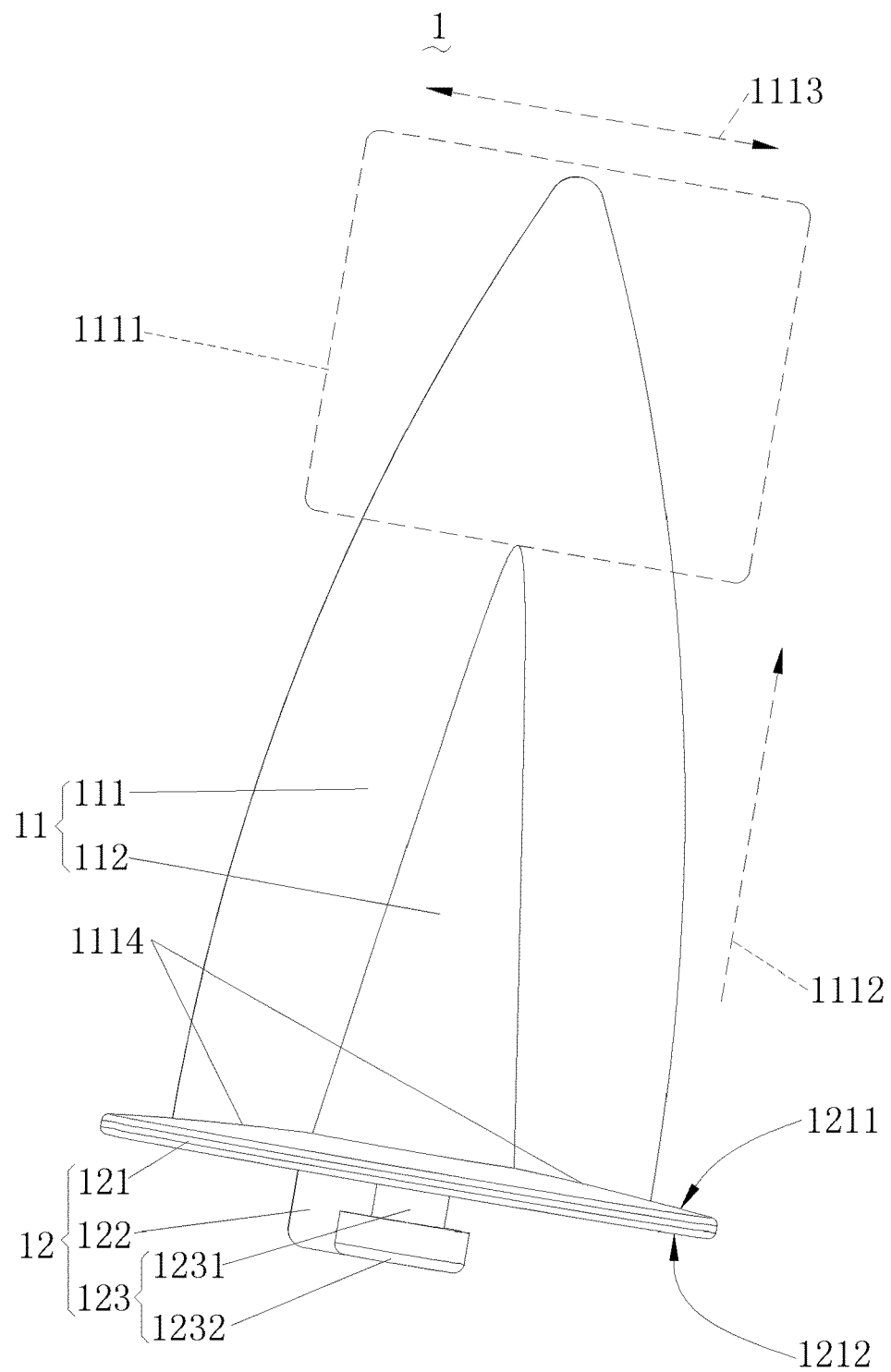
FIG. 1 is a schematic view of a supporting member for diffusion plate of an embodiment.
Figure 2:
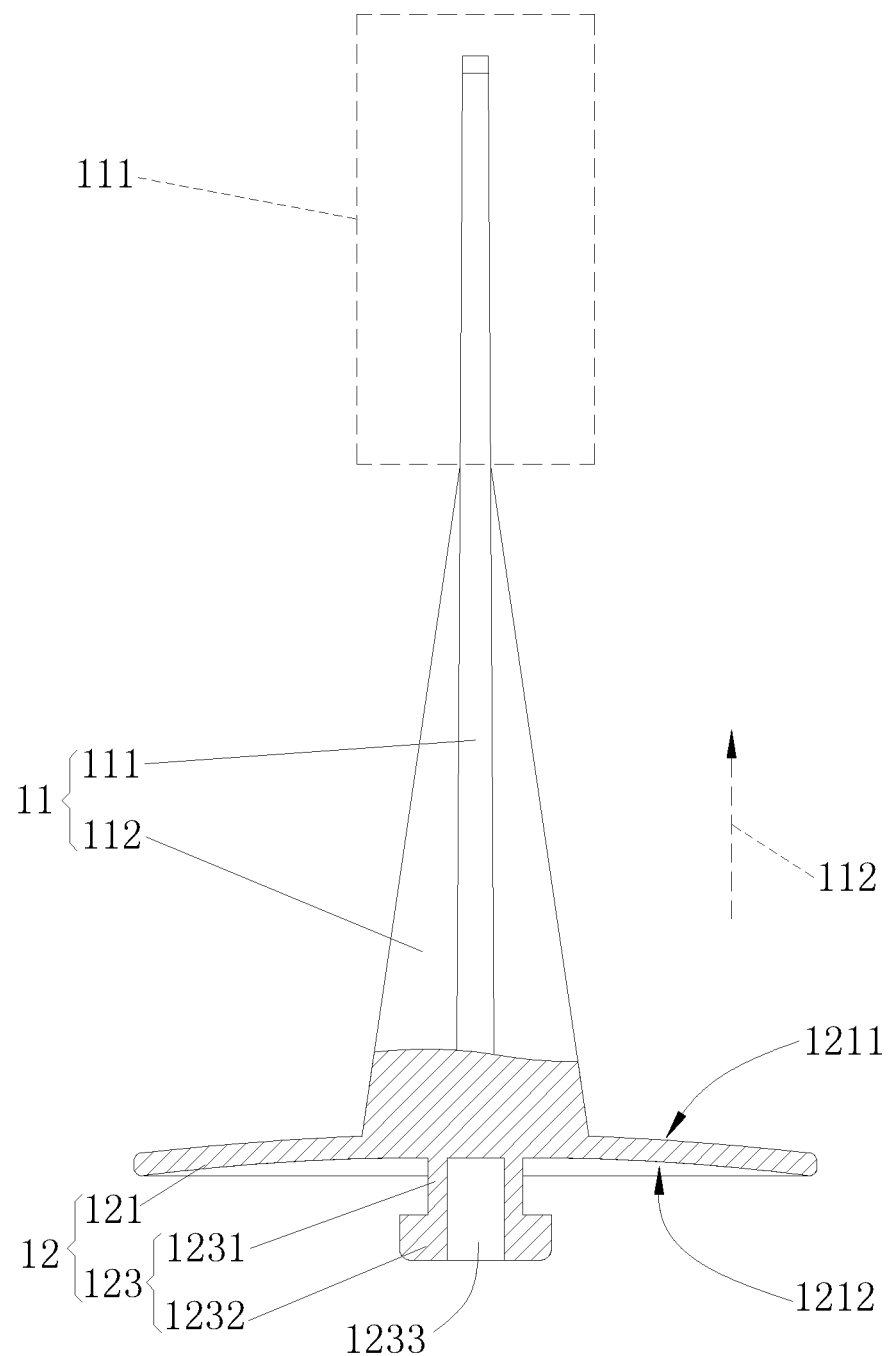
FIG. 2 is a partial cross-sectional view of the supporting member of FIG. 1 viewed from another aspect.

The present disclosure provides a supporting member for diffusion plate 1, which is mounted between a backplane and a diffusion plate. Referring to FIG. 1 and FIG. 2, in the embodiment, the supporting member for diffusion plate 1 includes: a fixing portion 12, and a supporting portion 11. The fixing portion 12 is secured to the backplane; the supporting portion 11 connects with the fixing portion 12 and extends opposite from the fixing portion 12. The supporting portion 11 contacts and supports the diffusion plate, when the supporting portion 11 is pressed by a force from the extending direction 1112, the supporting portion 11 causes an elastic deformation and shorten along the extending direction 1112.

The disclosed supporting member for diffusion plate 1 can cause an elastic deformation when being pressed by the diffusion plate, which buffers the compression of the diffusion plate, thus avoiding the crack of the diffusion plate, the crack of the liquid crystal panel located on the light-emitting surface of the diffusion plate, or the crack of the supporting member for diffusion plate 1.

The supporting member for diffusion plate 1 will be described further by combining a description of a backlight module.

Figure 3:
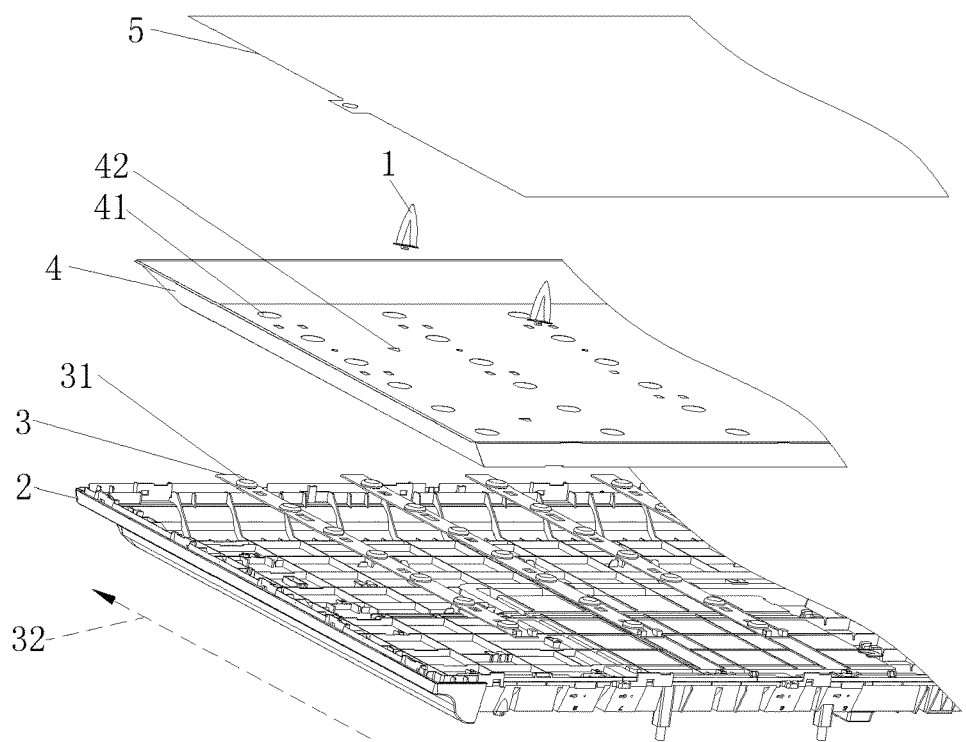
FIG. 3 is an exploded perspective view of a backlight module of an embodiment.

In the embodiment, a backlight module is also provided. Referring to FIG. 3, the backlight module includes a backplane 2, a lamp 3, a reflecting panel 4, a diffusion plate 5, and the supporting member for diffusion plate 1. The diffusion plate 5 is mounted to the top side of the backplane 2, the supporting member for diffusion plate 1 is mounted between the backplane 2 and the diffusion plate 5 to support the diffusion plate 5. The lamp 3 and the reflecting panel 4 are positioned between the backplane 2 and the diffusion plate 5, the backplane 2 defines mounting holes for mounting the lamp 3 and the reflecting panel 4. The lamp 3 and the reflecting panel 4 are both mounted on the side of the backplane 2 towards the diffusion plate 5, the lamp 3 includes an illuminator 31, the reflecting panel 4 defines a through hole 41, the illuminator 31 passes through the through hole 41 to illuminate the diffusion plate 5. The reflecting panel 4 reflects the light to the diffusion plate 5, which enhance the light intensity received by the diffusion plate 5.

The backplane 2 defines a mounting structure on the surface towards the diffusion plate 5; the reflecting panel 4 defines a through hole 42 therein corresponding to the position of the mounting structure, the through hole 42 is for the passing through of the supporting member for diffusion plate 1.

Figure 7:
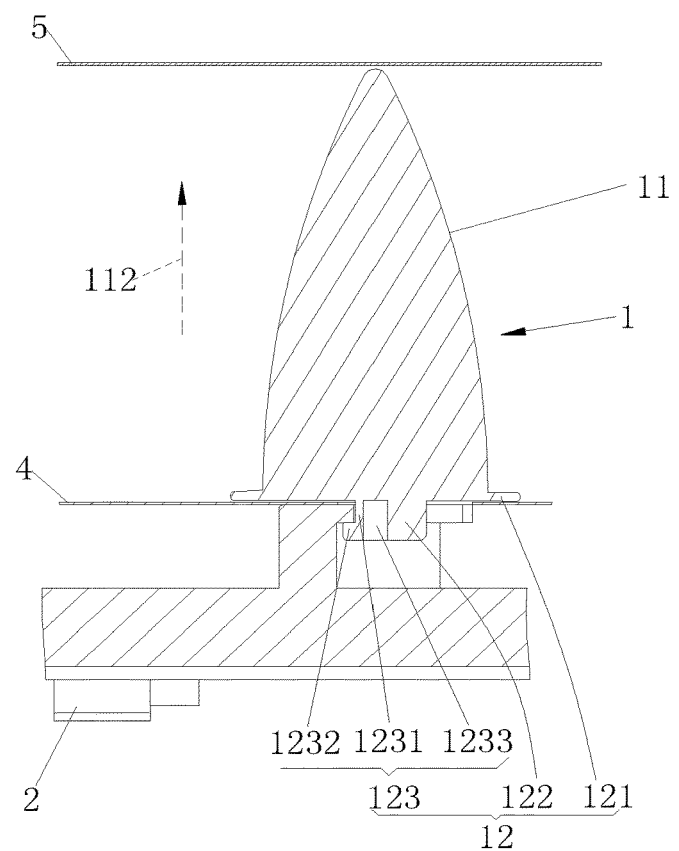
FIG. 7 is an assembled view of the backlight module shown in FIG. 6.

Referring to FIG. 7 further, the fixing portion 12 of the supporting member for diffusion plate 1 is secured to the mounting structure of the backplane 2; the supporting portion 11 connects to the fixing portion 12 and extends opposite from the fixing portion 12, the supporting portion 11 contacts and supports the diffusion plate 5; when the supporting portion 11 is pressed by a force from the extending direction 1112, the supporting portion 11 causes an elastic deformation and shortens along the extending direction 1112.

In the embodiment, the backlight module can cause an elastic deformation when the diffusion plate 5 is pressed by the liquid crystal panel positioned on the light-emitting surface of the diffusion plate 5, which buffers the compression, thus avoiding the crack of the diffusion plate 5, the crack of the liquid crystal panel located on the light-emitting surface of the diffusion plate 5, or the crack of the supporting member for diffusion plate 1.

In the embodiment, the shape of the reflecting panel 4 and the lamp 3 and their structure relationship will not affect the backlight module to achieve the effect disclosed above. Therefore, in another embodiment, the reflecting panel 4 can be omitted, or the structure relationship between the reflecting panel 4 and the lamp 3 can be different.

In the embodiment, the supporting portion 11 includes: a supporting plate 111 and a reinforcing rib 112. The supporting plate 111 connects the fixing portion 12 and extends opposite from the fixing portion 12 (i.e., the extending direction 1112). The reinforcing rib 112 connects the junction of the fixing portion 12 and the supporting plate 111, to improve the supporting effect of the supporting plate 111. The portion of the supporting plate 111 between the top end of the supporting plate 111 and the connecting position of the reinforcing rib 112 and the supporting plate 111 defines an elastic deformation portion 1111; when the supporting portion 11 being pressed by a force from the extending direction 1112, the elastic deformation portion 1111 causes an elastic deformation to allow the supporting portion 11 shortening along the extending direction 112. In the embodiment, in one aspect, the supporting member for diffusion plate 1 of the backlight module is integrated formed using a same kind of material, thus the supporting member for diffusion plate 1 has a simple structure, which can be mounted easily. In another aspect, the supporting plate 111 has a good toughness to cause elastic deformation to prevent the diffusion plate 5 from damage; for the reinforcement of the reinforcing rib, the supporting plate 111 also has enough strength to support the diffusion plate 5.

It is understood that, in another embodiment, the supporting member for diffusion plate can be manufactured using kinds of materials. For example, a buffering rubber cat is defined on the top end of the supporting portion 11; the supporting portion 11 is connected to the fixing portion 12 by an elastic member.

In the embodiment, the supporting plate 111 includes two short sides and two long sides 1114 (only a long side is shown in the FIG.), the two short sides and the two long sides corporately form a rectangle. There are two reinforcing ribs 112 in the embodiment, each reinforcing rib 112 locates at the middle of each long side 1114, the reinforcing rib 112 has a half circular bottom surface which connects the fixing portion 12, the reinforcing rib 112 gradually downsizes along the extending direction 1112; the supporting plate 111 also gradually downsizes along the extending direction 1112. In the embodiment, the two reinforcing ribs 112 corporately form a taper, the supporting plate 111 is "V" shaped.

It is understood that, in another embodiment, the reinforcing rib 112 can also be connected to the short side, for example, the reinforcing rib 112 is "C" shaped and around all the short sides and long sides.

In the embodiment, the supporting plate 111 has a thickness between 0.6 mm and 0.8 mm. The supporting plate 111 has a small thickness, thus having a good toughness, and can enhance the light transmission, which avoids the right-angle intersection lamp shadow introduced by the shading of light of the supporting member.

Figure 4:
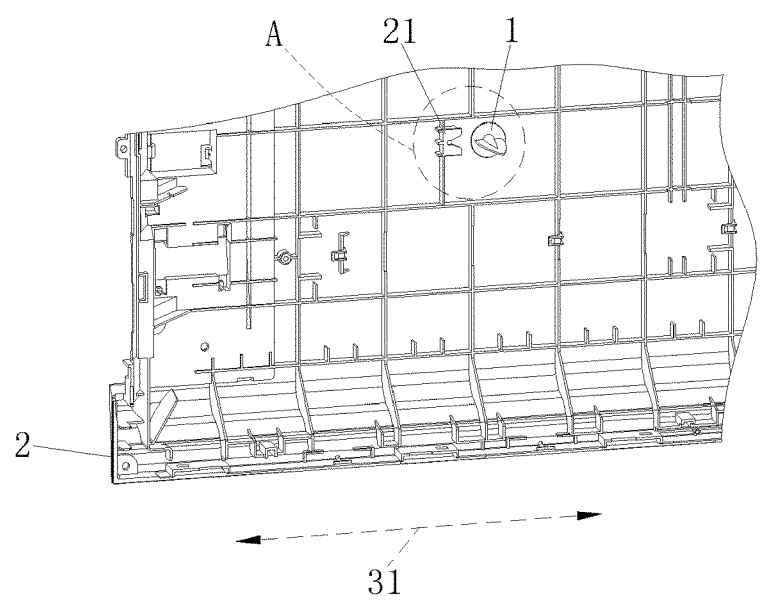
FIG. 4 is a partial view of the backlight module shown in FIG. 3 viewed from another aspect.
Figure 5:
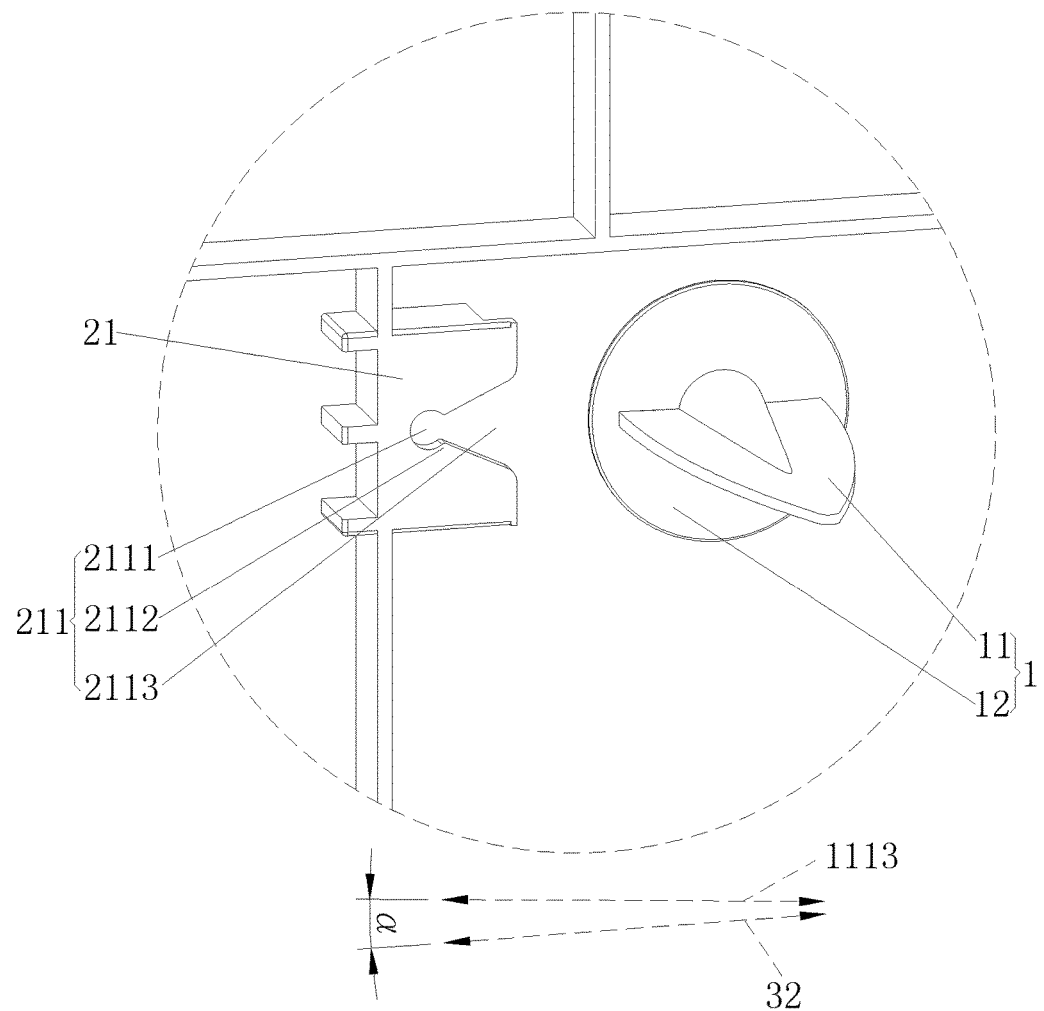
FIG. 5 is an enlarged view of a circled portion A of FIG. 4.

Referring to the FIG. 4 and FIG. 5 further, in the embodiment, the fixing portion 12 of the supporting member for diffusion plate 1 includes: a connecting plate 121 and a latch 123. The supporting portion 11 of the supporting member for diffusion plate 1 is protruded on a top surface 1211 of the connecting plate 121; the latch 123 of the supporting member for diffusion plate 1 is protruded on a bottom surface 1212 of the connecting plate 121. The latch 123 includes a neck portion 1231 and a head portion 1232, the neck portion 1231 connects the connecting plate 121 and the head portion 1232, the head portion 1232 is larger than the neck portion 1231.

The mounting structure of the backplane 2 includes a base piece 21 formed on the backplane 2, and a latching notch 211 defined in the base piece 21 corresponding to the latch 123; the latching notch 211 includes a wide notch portion 2111 and a narrow notch portion 2113.

When the latch 123 inserts in the wide notch portion 2111 of the latching notch 211, the latch 123 can move freely; when the latch 123 inserts in the narrow notch portion 2113, the connecting plate 121 and the head portion 1232 of the latch 123 resist the two opposite sides of the base piece respectively, allow the supporting member for diffusion plate 1 assembling to the backplane 2.

In the embodiment, the supporting member for diffusion plate 1 is assembled to the backplane 2 by the match of the latch 123 and the latching notch 211, which can be mounted and detached more easily, and adapted for sheet metal backplane and plastic backplane.

It is understood that, in another embodiment, the supporting member for diffusion plate 1 can also be mounted on the backplane 2 by inlaying grafting, screw tight, or bonding.

Figure 6:
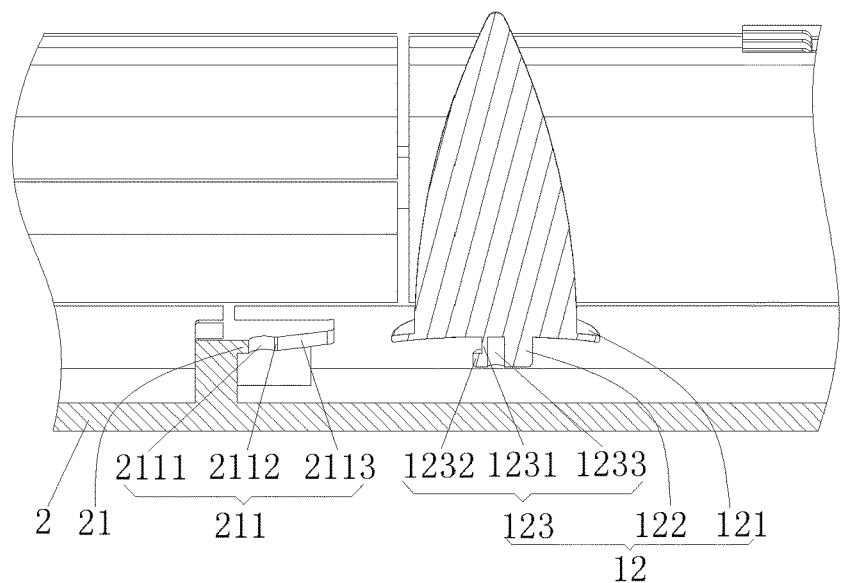
FIG. 6 is a cross-sectional view of the backlight module shown in FIG. 4 viewed from another aspect.

Referring to FIG. 6 and FIG. 7 further, in the embodiment, a neck notch portion 2112 is defined at the conjunction of the wide notch portion 2111 and the narrow notch portion 2113. The smallest width of the neck notch portion 2112 is smaller than the smallest width of the neck portion 1231 of the latch 123, which limits the latch 123 in the narrow notch portion 2113.

An abdicating hole 1233 is defined in the surface of the latch 123 away from the connecting plate 121; when the latch 123 removes between the wide notch portion 2111 and the narrow notch portion 2113, the latch 123 is pressed by the edge of the neck notch portion 2112 to deform towards the abdicating hole 1233, and when the latch 123 positions in the wide notch portion 2111 or the narrow notch portion 2113, the latch 123 recover its elasticity.

In the embodiment, the neck notch portion 2112 has a width of about 2.0 mm to about 2.1 mm, the neck portion 1231 of the latch 123 is a cylinder having a diameter of about 2.5 mm. The latch 123 having the abdicating hole 1233 has a smallest wall thickness of about 0.5 mm, thus the latch 123 has an enough strength and toughness. The size mentioned above is merely an embodiment here.

In the embodiment, the latch 123 can be secured in the narrow notch portion 2113, thus the supporting member for diffusion plate 1 is securely assembled to the backplane 2.

The fixing portion 12 of the supporting member for diffusion plate 1 further includes a limiting member 122, the limiting member 122 is protruded from the bottom surface 1212 of the connecting plate 121. When the latch 123 inserts in the narrow notch portion 2113 of the latching notch 211, the limiting member 122 inserts in the wide notch portion 2111, and when the latch 123 rotates in the narrow notch portion 2113, the limiting member 122 resists the edge of the wide notch portion 2111, thus limiting the rotation of the supporting member for diffusion plate 1. It is understood that, in another embodiment, the supporting member for diffusion plate 1 can also be limited by the match of the limiting member 122 and other notches defined in the backplane.

Referring to FIG. 3 and FIG. 5, for the match of the limiting member 122 and the wide notch portion 2111, the angle between the longitudinal direction 1113 of the supporting plate 111 of the supporting member for diffusion plate 1 and the longitudinal direction 32 of the lamp is smaller than 10°, which will not affect the light transmission even the supporting member for diffusion plate 1 rotates.

The supporting member for diffusion plate 1 should be fastened to the backplane. Therefore, in the embodiment, the connecting plate 121 of the supporting member for diffusion plate 1 and the head portion 1232 of the latch 123 should clamp the base piece 21. Commonly, clamping match will lead to a difficult assembly, to overcome the difficulties, referring to FIG. 2 again, in the embodiment, the bottom surface of the connecting plate 121 of the supporting member for diffusion plate 1 depresses to present like a dish. Referring to FIG. 7 again, when the latch 123 inserts in the narrow notch portion 2113 of the latching notch 211, the dish shaped connecting plate 121 causes an elastic deformation by the resisting of the reflecting panel 4 and the base piece 21, allow the connecting plate 121 and the head portion 1232 of the latch 123 clamping the base piece 21. The connecting plate 121 of the supporting member for diffusion plate 1 is elastic, which makes the assembly be more facility.

In the embodiment, the bottom surface 1212 of the connecting plate 121 is arcuate, thus the edge of the bottom surface 1212 defines the lowest point, the middle of the bottom surface 1212 defines the highest point. In the embodiment, the distance between the highest point and the lowest point is about 0.5 mm, which make the connecting plate 121 has an excellent strength and toughness. It is understood that the sizes mentioned above is merely an embodiment here, not to limit the scope of the disclosure.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A supporting member for diffusion plate, mounted between a backplane and a diffusion plate, comprising:
   a fixing portion and a supporting portion; the fixing portion being secured to the backplane; the supporting portion connecting the fixing portion and extending opposite from the fixing portion; the supporting portion contacting and elastically supporting the diffusion plate, when the supporting portion being pressed by a force from an extending direction of the supporting portion, the supporting portion causing an elastic deformation and shortening along the extending direction;
   the supporting portion comprises: a supporting plate and one or more reinforcing ribs; the supporting plate connects the fixing portion and extends opposite from the fixing portion; the reinforcing rib connects a junction of the fixing portion and the supporting plate to improve supporting of the supporting plate; the portion of the supporting plate between a top end of the supporting plate and a connecting position of the reinforcing rib and the supporting plate defines an elastic deformation portion; when the supporting portion being pressed by a force from the extending direction, the elastic deformation portion causes an elastic deformation to allow the supporting portion shortening along the extending direction, wherein the supporting plate comprises two short sides and two long sides connected with the fixing portion; a quantity of the reinforcing ribs is two, each reinforcing rib locates at middle of each long side.

2. The supporting member for diffusion plate according to claim 1, wherein the reinforcing rib has a half circular bottom surface which connects the fixing portion, the reinforcing rib gradually downsizes along a direction opposite from the fixing portion.

3. The supporting member for diffusion plate according to claim 2, wherein the supporting plate gradually downsizes along the direction opposite from the fixing portion.

4. A backlight module, comprising:
   a backplane, a diffusion plate, and a supporting member for diffusion plate; the diffusion plate being mounted to the top side of the backplane, the supporting member for diffusion plate being mounted between the backplane and the diffusion plate to support the diffusion plate;
   the backplane defining a mounting structure on a surface of the backplane towards the diffusion plate;
   the supporting member for diffusion plate comprising: a fixing portion and a supporting portion; the fixing portion being secured to the mounting structure of the backplane; the supporting portion connecting the fixing portion and extending opposite from the fixing portion, the supporting portion contacting and supporting the diffusion plate, when the supporting portion being pressed by a force from an extending direction of the supporting portion, the supporting portion causing an elastic deformation and shortening along the extending direction;
   the supporting portion comprises: a supporting plate and one or more reinforcing ribs; the supporting plate connects the fixing portion and extends opposite from the fixing portion; the reinforcing rib connects a junction of the fixing portion and the supporting plate; the portion of the supporting plate between a top end of the supporting plate and a connecting position of the reinforcing rib and the supporting plate defines an elastic deformation portion; when the supporting portion being pressed by a force from the extending direction, the elastic deformation portion causes an elastic deformation to allow the supporting portion shortening along the extending direction, wherein the supporting plate comprises two short sides and two long sides connected with the fixing portion; a quantity of the reinforcing ribs is two, each reinforcing rib locates at the middle of each long side.

5. The backlight module according to claim 4, wherein the reinforcing rib has a half circular bottom surface which connects the fixing portion, the reinforcing rib gradually downsizes along the extending direction.

6. The backlight module according to claim 5, wherein the supporting plate gradually downsizes along the extending direction.

7. The backlight module according to claim 6, further comprising a lamp, the lamp being mounted on a surface of the backplane opposite to the diffusion plate; the angle between a longitudinal direction of the supporting plate and a longitudinal direction of the lamp being smaller than 10°.

8. The backlight module according to claim 4, wherein the fixing portion of the supporting member for diffusion plate comprises: a connecting plate and a latch; the supporting portion of the supporting member for diffusion plate is protruded on a top surface of the connecting plate; the latch of the supporting member for diffusion plate is protruded on a bottom surface of the connecting plate; the latch comprises a neck portion and a head portion, the neck portion connects the connecting plate and the head portion, the head portion is larger than the neck portion; the mounting structure of the backplane comprises a base piece formed on the backplane, and a latching notch defined in the base piece corresponding to the latch; the latching notch comprises a wide notch portion and a narrow notch portion;

the latch move freely when the latch inserts in the wide notch portion of the latching notch; when the latch inserts in the narrow notch portion, the connecting plate and the head portion of the latch resist the two opposite sides of the base piece respectively, allow the supporting member for diffusion plate assembling to the backplane.

9. The backlight module according to claim 8, wherein a neck notch portion is defined at the conjunction of the wide notch portion and the narrow notch portion; the smallest width of the neck notch portion is smaller than the smallest width of the neck portion of the latch, the neck notch portion limits the latch in the narrow notch portion; an abdicating hole is defined in the surface of the latch away from the connecting plate; when the latch removes between the wide notch portion and the narrow notch portion, the latch is pressed by the edge of the neck notch portion and deforms towards the abdicating hole, and when the latch positions in the wide notch portion or in the narrow notch portion, the latch recover its elasticity.

10. The backlight module according to claim 9, wherein the fixing portion of the supporting member for diffusion plate further comprises a limiting member, the limiting member is protruded from the bottom surface of the connecting plate; when the latch inserts in the narrow notch portion of the latching notch, the limiting member inserts in the wide notch portion, and when the latch rotates in the narrow notch portion, the limiting member resists the edge of the wide notch portion, which limit the rotation of the supporting member for diffusion plate.

11. The backlight module according to claim 10, wherein the bottom surface of the connecting plate of the supporting member for diffusion plate depresses to present like a dish; when the latch inserts in the narrow notch portion of the latching notch, the dish shaped connecting plate causes an elastic deformation by the resisting of the base piece, allow the connecting plate and the head portion of the latch clamping the base piece.

12. The backlight module according to claim 11, further comprising a lamp, the lamp being mounted on a surface of the backplane opposite to the diffusion plate; the angle between the longitudinal direction of the supporting plate and the longitudinal direction of the lamp being smaller than 10°.

13. The backlight module according to claim 8, wherein the fixing portion of the supporting member for diffusion plate further comprises a limiting member, the limiting member is protruded from the bottom surface of the connecting plate; when the latch inserts in the narrow notch portion of the latching notch, the limiting member inserts in the wide notch portion, and when the latch rotates in the narrow notch portion, the limiting member resists the edge of the wide notch portion, which limit the rotation of the supporting member for diffusion plate.

14. The backlight module according to claim 8, wherein the bottom surface of the connecting plate of the supporting member for diffusion plate depresses to present like a dish; when the latch inserts in the narrow notch portion of the latching notch, the dish shaped connecting plate causes an elastic deformation by the resisting of the base piece, allow the connecting plate and the head portion of the latch clamping the base piece.

15. The backlight module according to claim 8, further comprising a lamp, the lamp being mounted on a surface of the backplane opposite to the diffusion plate; the angle between the longitudinal direction of the supporting plate and the longitudinal direction of the lamp being smaller than 10°.

* * * * *